United States Patent
Hall

(10) Patent No.: US 7,716,403 B2
(45) Date of Patent: May 11, 2010

(54) INFORMATION TECHNOLOGY INTEGRATION WITH AUTOMATION SYSTEMS

(75) Inventor: Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 170 days.

(21) Appl. No.: 11/239,855

(22) Filed: Sep. 30, 2005

(65) Prior Publication Data

US 2007/0079028 A1    Apr. 5, 2007

(51) Int. Cl.
*G06F 13/42*    (2006.01)
*G06F 15/16*    (2006.01)
*G06F 13/00*    (2006.01)

(52) U.S. Cl. .................. 710/106; 710/28; 710/30; 710/62; 711/147; 711/149; 711/168; 709/231; 709/239

(58) Field of Classification Search ............ None
See application file for complete search history.

(56) References Cited

U.S. PATENT DOCUMENTS

| | | | |
|---|---|---|---|
| 4,775,932 A | 10/1988 | Oxley et al. | |
| 4,908,746 A | 3/1990 | Vaughn | |
| 5,508,909 A | 4/1996 | Maxwell et al. | |
| 5,975,737 A | 11/1999 | Crater et al. | |
| 6,075,796 A | 6/2000 | Katseff et al. | |
| 6,151,625 A | 11/2000 | Swales | |
| 6,252,544 B1* | 6/2001 | Hoffberg | 342/357.1 |
| 6,295,571 B1* | 9/2001 | Scardamalia et al. | 710/308 |
| 6,411,987 B1 | 6/2002 | Steger et al. | |
| 6,437,692 B1* | 8/2002 | Petite et al. | 340/540 |
| 6,671,760 B1 | 12/2003 | Kawasiki et al. | |
| 6,760,782 B1 | 7/2004 | Swales | |
| 6,785,239 B1* | 8/2004 | Tasker | 370/238 |
| 6,891,838 B1* | 5/2005 | Petite et al. | 370/401 |
| 6,952,727 B1 | 10/2005 | Lindner et al. | |
| 6,975,913 B2 | 12/2005 | Kreidler et al. | |
| 6,975,914 B2 | 12/2005 | DeRemer et al. | |
| 7,218,648 B1 | 5/2007 | Jackson | |

(Continued)

FOREIGN PATENT DOCUMENTS

EP    1420315    5/2004

(Continued)

OTHER PUBLICATIONS

International Search Report for PCT Application No. US06/34901 dated Nov. 7, 2007, 3 pgs.

(Continued)

*Primary Examiner*—Eron J Sorrell
*Assistant Examiner*—Dean Phan
(74) *Attorney, Agent, or Firm*—Turocy & Watson LLP; R. Scott Speroff; John M. Miller

(57) ABSTRACT

The subject disclosure pertains to transparent communications in an industrial automation environment amongst automation system components and IT systems. Systems and methods are provided that send and receive data to, from and amongst automation devices and transactional based IT systems. The system is viewed as a control system to the automation device and as a transactional system to the IT system. Accordingly, it is not necessary to provide a custom interface between automation devices and the IT systems.

16 Claims, 13 Drawing Sheets

U.S. PATENT DOCUMENTS

| | | |
|---|---|---|
| 2002/0156837 A1 | 10/2002 | Batke et al. |
| 2004/0068749 A1 | 4/2004 | Crater et al. |
| 2006/0146881 A1 | 7/2006 | Basso et al. |

FOREIGN PATENT DOCUMENTS

| | | |
|---|---|---|
| WO | 0182138 | 11/2001 |
| WO | 0248809 | 6/2002 |

OTHER PUBLICATIONS

European Search Report dated Sep. 14, 2009 mailed Sep. 15, 2009 for European Patent Application Serial No. 06803127.7, 7 Pages.

* cited by examiner

INFORMATION TECHNOLOGY INTEGRATION WITH AUTOMATION SYSTEMS

TECHNICAL FIELD

The subject invention relates generally to industrial automation systems and more particularly toward data interaction and connectivity.

BACKGROUND

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or affect outputs associated with control of the process. A typical control routine can be created in a controller configuration environment that has various tools and interfaces whereby a developer can construct and implement a control strategy using industrial and conventional programming languages or graphical representations of control functionality.

Industrial controllers measure inputs and control outputs in a serial continuous manner. Inputs and outputs can be recorded in I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like. During execution of the control routine, values of the inputs and outputs exchanged with the controlled process can pass through memory. Values of inputs in memory can be asynchronously or synchronously updated from the controlled process by dedicated and/or common scanning circuitry. The input values in a data table are updated and modified in real-time. Similarly, output control variables are calculated constantly.

Other areas of an enterprise system may wish to utilize the data measured by an industrial controller or keep a record of the output conditions. For instance, a database might be used to keep records of the values of certain inputs or outputs. This could be desired in situations where decisions affecting the overall manufacturing process are heavily influenced by a particular aspect of the industrial process. Enterprise Information Technology (IT) systems, such as database systems, are transactional in nature. As such, the data in the real-time controller environment is typically retrieved in scheduled batches at periodic intervals by complex custom systems.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns industrial automation systems and communications between the continuous serial environment of an industrial controller and the transactional environment of IT systems. This is accomplished by data sending and receiving components that perform synchronous sending and receiving of data between and amongst one or more controllers and an IT system.

According to one aspect of the subject invention, control data is transmitted from an industrial controller over a network to an IT system. The transmitted data is split into packets according to the packet size limitations of the network and the protocol used for transmission. The recipient reassembles the fragmented data after transmission.

In another aspect of the subject invention, interface components are viewed as being a controller system to the industrial control side of the system and an IT system to the transactional side of the communication system. This is accomplished by converting transmitted data within the interface components from a format protocol recognized by the controller to a format utilized by the IT system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or other processor based device. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
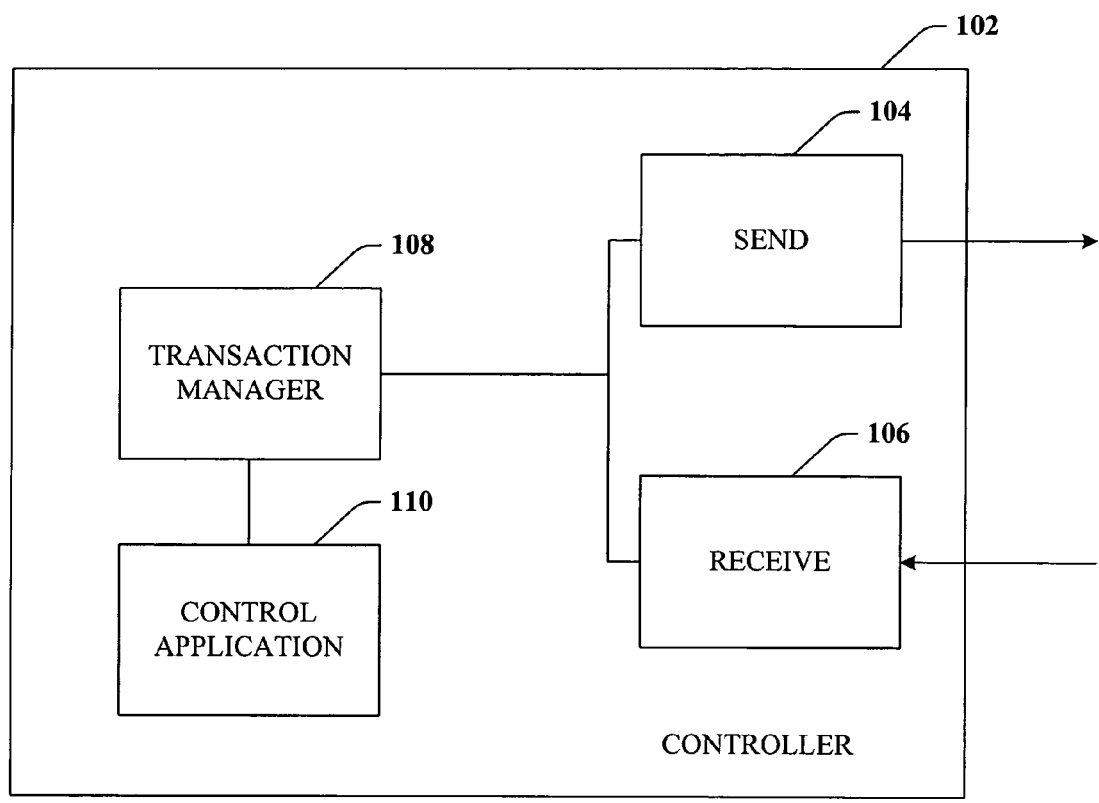
FIG. 1 is a block diagram of an industrial controller communication system in accordance with an aspect of the subject invention.

Referring initially to FIG. 1, a communication system 100 is illustrated that facilitates data exchange according to one aspect of the subject invention. More specifically, communication system 100 facilitates data transmission and retrieval between an industrial automation device such as a controller and another automation device or remote system (e.g. database, web service . . . ). System 100 includes an industrial controller 102 with a control application 110 created by the user of controller 102, for instance.

Control application 110 contains instructions that are executable by the controller 102 to perform tasks described by the instructions. For example, control application 110 can instruct the controller 102 to continuously poll data from an automation device such as a gas pressure sensor. Control application 110 may also be responsible for automatically adjusting outputs based upon the polled data. Furthermore, control application 110 can also instruct the controller 102 to transmit the polled data to a remote system such as a database and/or service. Controller 102 can also be instructed by control application 110 to receive and process data from an external source. To facilitate the transmitting and receiving tasks, a send component 104 and a receive component 106 are associated with controller 102.

Send component 104 is utilized to accomplish a synchronous data transmission to a remote system (not shown), among other things, from within the continuous operating environment of controller 102. Send component 104 can be accessed using a synchronous send instruction. This instruction can be available in the programming environment used to create control application 110. The details of the data transmission are transparent and are managed by send component 104. For example, if the communications network the transmission is sent over uses a protocol restricting packet size to 512 bytes and the data size is 1024 bytes, the send component 104 can split the data into two or more packets of 512 bytes or smaller prior to transmission. The user is not required to account for this detail in control application 110. Transaction manager 108, associated with controller 102, controls the operation of send component 104. FIG. 1 depicts the transaction manager 108 separate from send component 104, but it is to be appreciated that the transaction manager 108 can be integrated into send component 104. When a synchronous send instruction is encountered in control application 110, control of the send operation is transferred to transaction manager 108. Transaction manager 108 maintains data integrity by ensuring the data polled by controller 102 does not change while the send component 104 is transmitting the data to the remote system. Transaction manager 108 can be responsible for concurrency control of the data polled by controller 102 between controller 102, send component 104 and receive component 106. This may be accomplished, for example, by locking the controller data while one component manipulates the data to prevent other components from accessing the same data. As the data remains constant during transmission, the send component 104 is able to transfer controller data from the continuous serial environment of controller 102 to a transactional system such as a database, web service, or the like. Send component 104 will appear to the remote system as the same type of system and will behave accordingly. For example, if the remote system is a database, then send component 104 will appear to the database as a database client and will behave as such by communicating using the client protocol for the database. Thus, send component 104 will format the data according to the requirements of the remote system.

Receive component 106 is utilized to accomplish a synchronous data delivery of data from an external source (not shown). In a manner similar to send component 104, the receive component 106 can be accessed by a synchronous receive instruction in control application 110. Receive component 106 manages the details of data reception similar to send component 104. For example, if data with a total size of 1024 bytes is sent to receive component 106 on a communication network restricting the packet size to 512 bytes, the receive component 106 assembles the disparate packets to join the delivered data in one piece to enable controller 102 to process it. Receive component 106 is also associated with transaction manager 108. It is to be appreciated that receive component 106 may interact with the same transaction manager that send component 104 interacts with or a different transaction manager. Transaction manager 108 may also be integrated within receive component 106. Once data has been received by receive component 106, an event is triggered and the transaction manager 108 halts the controller 102 until the received data has been integrated into the controller 102. In this manner, data can be integrated into the continuous serial environment of controller 102 from a transactional external source. In a fashion similar to the send component 104, receive component 106 will appear to the external source to be of the same type. For example, if the external source is a database and the data to be sent is the response to a SELECT query, the database will view receive component 106 as a database client and send the data accordingly (e.g. using a database protocol such as ODBC or JDBC). Receive component 106 alters the received data into a format compatible with controller 102, for example, CIP or other industrial protocols.

Figure 2:
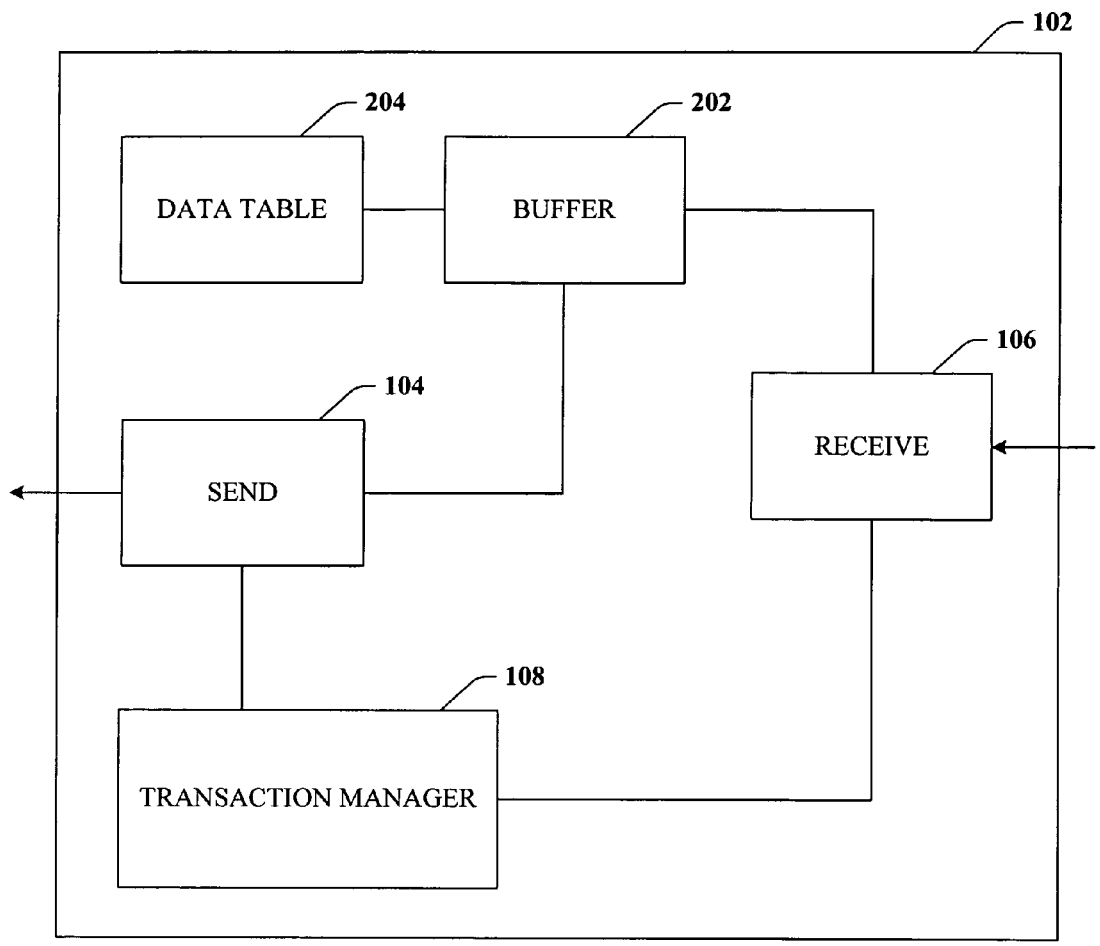
FIG. 2 is a block diagram of an industrial controller communication system in accordance with an aspect of the subject invention.

FIG. 2, depicts a communication system 200 in accordance with an aspect of the subject invention. System 200 includes controller 102 transaction manager 108, send component 104, and receive component 106 as shown in system 100 depicted in FIG. 1. System 200 further includes data table 204 and a buffer 202. Data table 204 contains the data that controller 102 acquired from an input device such as a sensor and data processed and manipulated by controller 102. Buffer 202 is a storage component operatively separate and isolated from data table 204. Buffer 202 is utilized by send component 104 and receive component 106 to perform a synchronous send and receive, as described in relation to FIG. 1, from the continuous serial environment of controller 102 to a transactional remote system (e.g. a database, a web service . . . ). When data is to be sent via the send component 104, transaction manager 108 temporarily blocks controller 102 from modifying the data table 204. For example, the transaction manager 108 can suspend the controller scheduler so that no other tasks are performed. The controller schedule is associated with control application 110 and is responsible for scheduling one or more tasks executing concurrently on controller 102. The portions of data table 204 that are to be transmitted are replicated in buffer 202. After replication, transaction manager 108 unlocks controller 102 and data table 204 and normal controller operations resume. Send component 104 transmits the data in buffer 202 according to the limits of the communications network and the requirements of the remote system as discussed in relation to system 100 in FIG. 1.

Receive component 106 also interacts with buffer 202. Receive component 106 responds to data being sent to controller 102. As described when discussing system 100, receive component 106 can receive data in multiple fragments. Receive component 106 will assemble one or more data fragments by using buffer 202. As data fragments are received, the fragments are placed into buffer 202 until all fragments have been assembled together in buffer 202. When the data has been fully assembled, receive component 106 notifies transaction manager 108. Transaction manager 108 blocks controller 102 from modifying the data table 204, for example, by suspending the controller scheduler. The data in buffer 202 is copied into the proper locations in the data table 204. After the data copy, transaction manager 108 unlocks controller 102 and data table 204.

Figure 3:
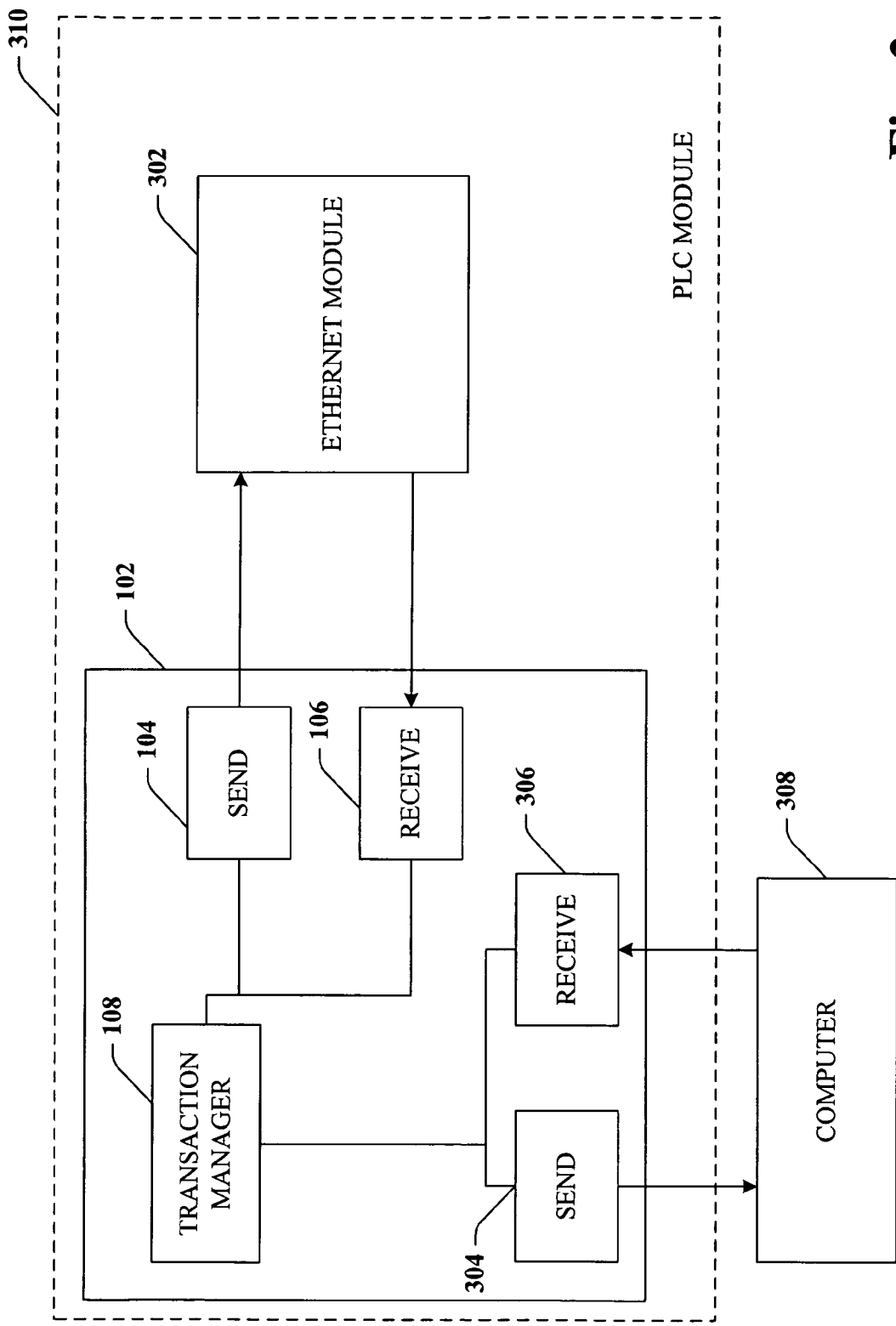
FIG. 3 is a block diagram of an industrial controller communication system that interacts with a computer in accordance with an aspect of the subject invention.

Turning briefly to FIG. 3, an industrial control communication system 300 illustrates an aspect of the subject invention. System 300 includes a PLC rack or module 310 and a computer 308. Computer 308 can be a PC, server, HMI, or the like. PLC rack 310 includes controller 102 and an Ethernet module 302. Controller 102 and Ethernet module 302 are communicatively coupled to the backplane of PLC rack 310. Controller 102 and Ethernet module 302 communicate with each other via send component 104 and receive component 106 associated with controller 102. Send component 304 and receive component 306 are similar to send component 104 and receive component 106 discussed in relation to FIG. 1. Controller 102 uses send and receive components 304 and 306 to communicate with computer 308 via a network (e.g. TCP/IP, RS232 . . . ). Transaction manager 108 controls the operation of both sets of send and receive components in the manner described before relative to FIGS. 1 and 2. Ethernet module 302 and computer 308 may be a final destination of data transmitted by send components 104 and 304 respectively or an intermediate destination. Similarly, Ethernet module 302 and computer 308 can be the primary source for data received by receive components 106 and 306 or an intermediate source.

Figure 4:
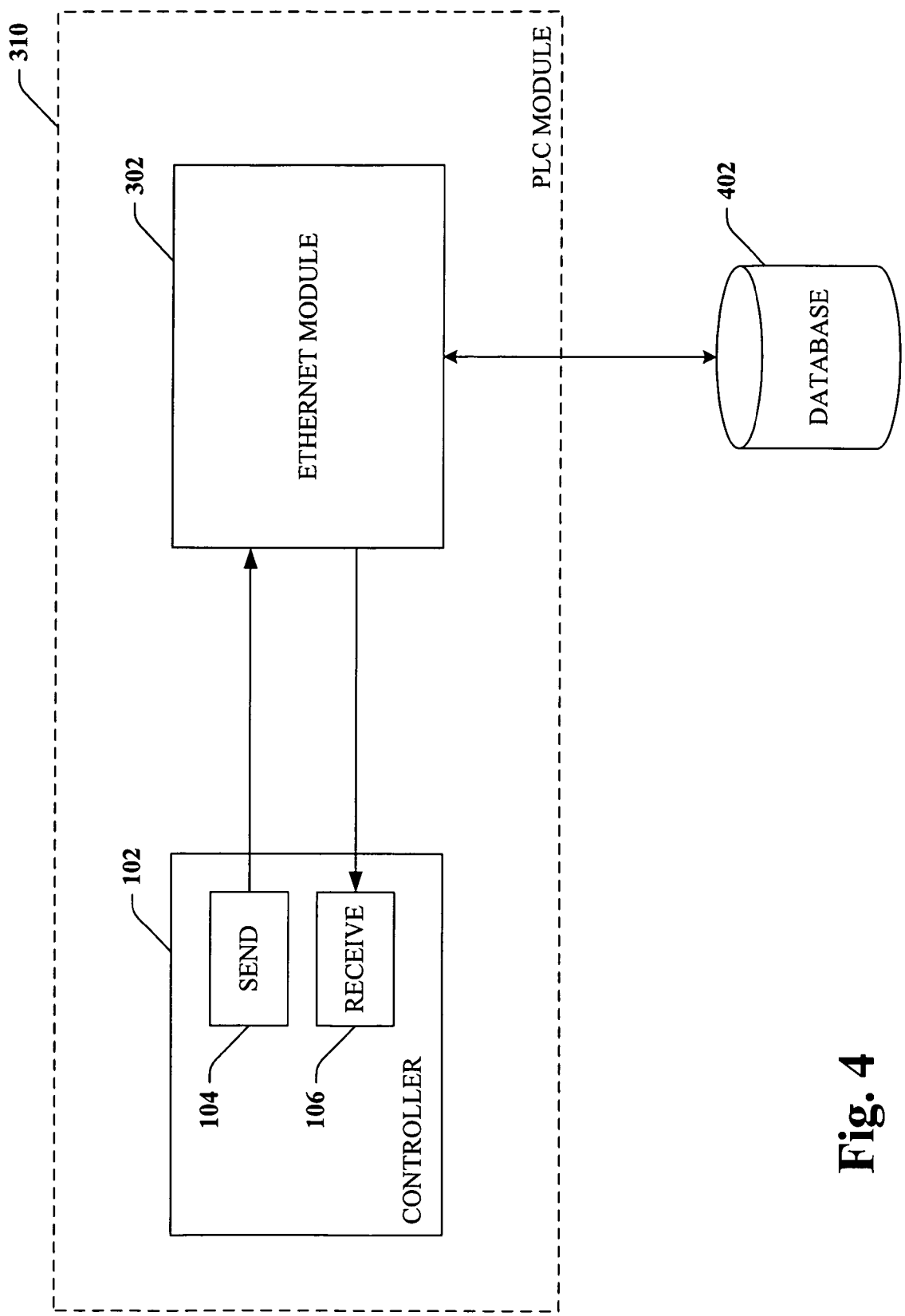
FIG. 4 is a block diagram of an industrial controller communication system that interacts with an IT system in accordance with an aspect of the subject invention.
Figure 5:
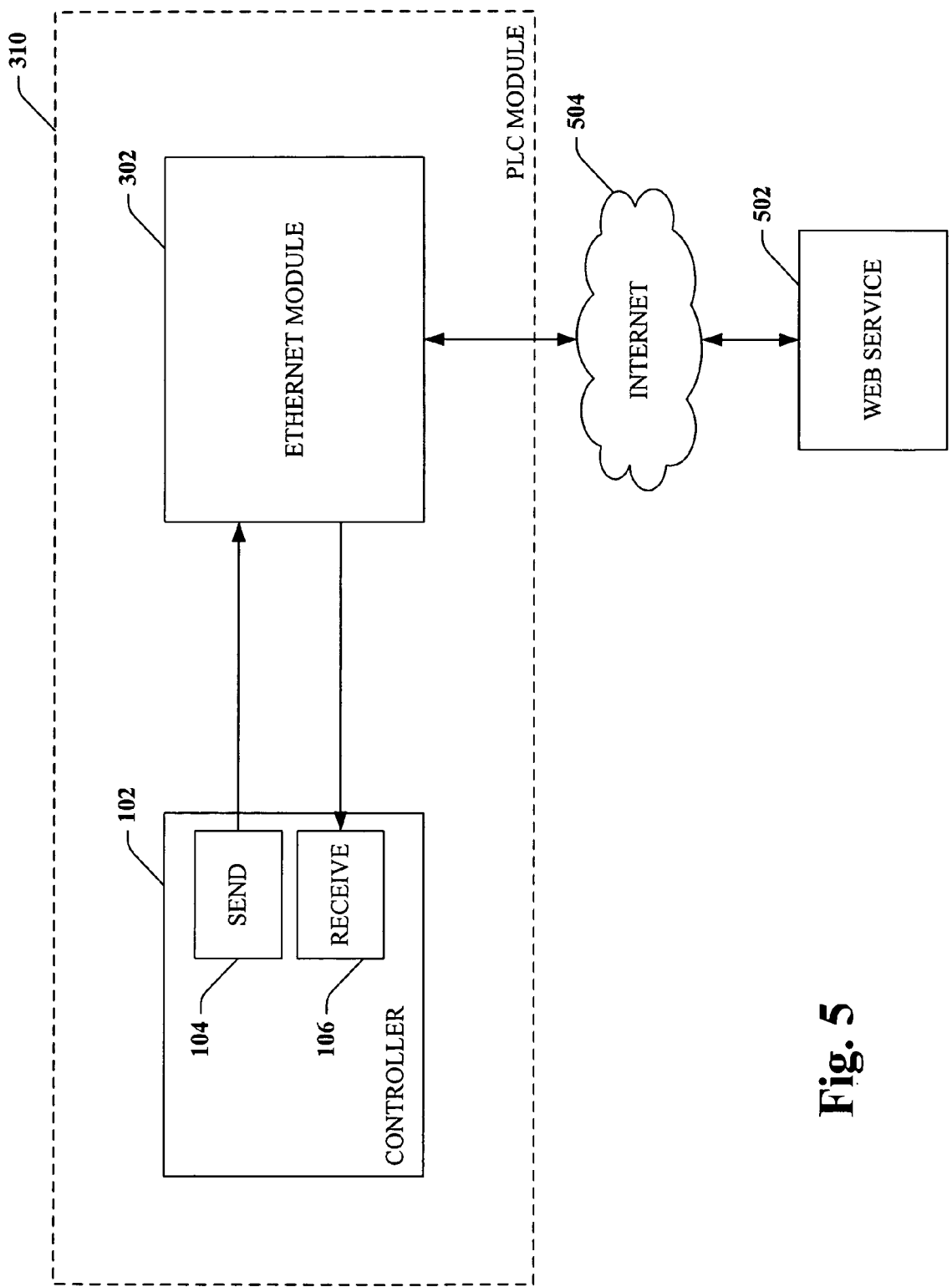
FIG. 5 is a block diagram of an industrial controller communication system that interacts with an IT system in accordance with an aspect of the subject invention.

Referring now to FIGS. 4 and 5, communication systems 400 and 500 are illustrated that exemplify aspects of the subject invention. Systems 400 and 500 include controller 102 and Ethernet module 302 associated with PLC rack 310. Controller 102 includes send component 104 and receive component 106. It is to be appreciated that computer 308 from FIG. 3 could also be used in place of Ethernet module 302.

Turning solely to FIG. 4, system 400 includes a database server 402. Controller 102 is communicatively coupled to database server 402 via Ethernet module 302. Database server 402 and Ethernet module 302 communicate via a network, for example a local area network, a wide area network, or the Internet. It is to be appreciated that the network could be any type of communications network (e.g. wired, wireless, satellite . . . ).

Controller 102 transmits data to database server 402 using send component 104. Send component 104 bridges the continuous serial environment of controller 102 with the transactional environment of database server 402 as discussed in reference to FIG. 2. Control data is formatted by send component 104 to a protocol utilized by database server 402. For example, the data is converted from CIP or another industrial protocol to a database protocol (e.g. ODBC, JDBC, OLE DB . . . ). After conversion, send component 104 transmits the data to database server 402 using Ethernet module 302 as an intermediary. In accordance with one aspect of the subject invention, send component 104 can transmit the data in multiple fragments according to packet size limitations imposed by the backplane of PLC rack 310 or the backplane protocol. Ethernet module 302 can rejoin the fragments before forwarding the data onto database server 402.

Receive component 106 is used by controller 102 to receive data from database server 402. Similar to send component 104, receive component 106 links the transactional environment of database server 402 with the continuous serial environment of controller 102. Database server 402 can respond to a request by controller 102, for example a SELECT query, and send data via Ethernet module 302. Receive component 106 converts the received data from a database protocol to the protocol used by controller 102. The data is then provided to controller 102. In accordance with one aspect of the subject invention, Ethernet component 302 can split the data sent by database server 402 into multiple fragments according to packet size limitations of the backplane. Receive component 106 assembles the fragments as discussed previously in reference to FIG. 2.

Turning to FIG. 5, system 500 includes a web service 502 communicatively coupled to the Internet 504. Controller 102 is also communicatively coupled to Internet 504 via Ethernet module 302. It is to be appreciated that web service 502 can be communicatively coupled to Ethernet module 302 via a local area network or wide area network. Web services are software systems that provide for interaction over a network, and specifically, the World Wide Web. Web services allow various systems that can be based on differing technology to exchange information according to standard web technologies such as HTML and XML. The differing systems can exchange data over a network such as the Internet using web services in a manner similar to inter process communications (e.g. threads, semaphores, shared memory . . . ) on a single machine.

Controller 102 transmits data to web service 502 using send component 104. Send component 104 bridges the continuous serial environment of controller 102 with the transactional environment of web service 502 as discussed in reference to FIG. 2. Control data is formatted by send component 104 to a protocol used to communicate with web service 502. For example, the data is converted from CIP or another industrial protocol to a transfer protocol (e.g. HTTP, FTP, SOAP . . . ). After conversion, send component 104 transmits the data to web service 502 on the Internet 504 using Ethernet module 302 as an intermediary. In accordance with one aspect of the subject invention, send component 104 can transmit the data in multiple fragments according to packet size limitations imposed by the backplane of PLC rack 310 or the backplane protocol. Ethernet module 302 can rejoin the fragments before forwarding the data onto the Internet 504 to web service 502.

Receive component 106 is used by controller 102 to receive data from web service 502. Similar to send component 104, receive component 106 links the transactional environment of web service 502 with the continuous serial environment of controller 102. Web service 502 can respond to a request by controller 102, for example a request for weather information from a weather web service, and send the response data via Ethernet module 302. Receive component 106 converts the received data from a web service protocol to the protocol used by controller 102. The data is then provided to controller 102. In accordance with one aspect of the subject invention, Ethernet component 302 can split the data sent by web service 502 into multiple fragments according to packet size limitations of the backplane. Receive component 106 assembles the fragments as discussed previously in reference to FIG. 2 before providing the data to controller 102.

Figure 6:
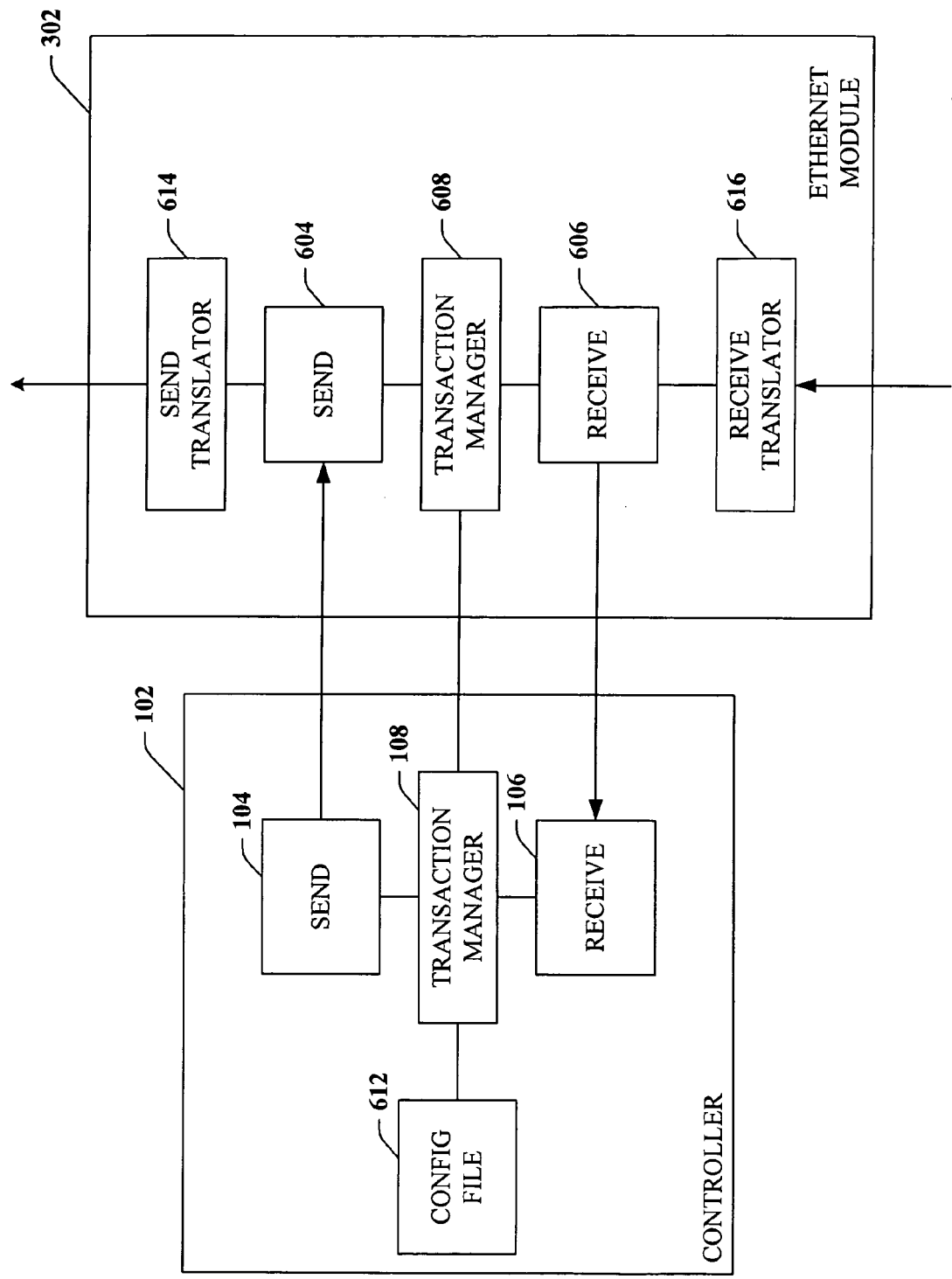
FIG. 6 is a block diagram of an industrial controller communication system in accordance with an aspect of the subject invention.

FIG. 6 illustrates a communication system 600 in accordance with an aspect of the subject invention. System 600 illustrates distributing send and receive operations between controller 102 and Ethernet module 302. It is to be appreciated that computer 308 from FIG. 3 could also be used in place of Ethernet module 302. Controller 102 includes transaction manager 108, send component 104, and receive component 106 as discussed with reference to FIGS. 1 and 2. Ethernet module 302 includes a transaction manager 608, a send component 604 and a receive component 606 that are similar to transaction manager 108, send component 104 and receive component 106, respectively.

A synchronous send operation to a remote system is performed by interactions between controller 102 and Ethernet module 302. Send component 104 is provided with data to be transmitted as described with reference to FIG. 2. Send component 104 and transaction manager 108 in controller 102 are associated with send component 604 and transaction manager 608 in Ethernet module 302. Send component 104 transmits data in one or more fragments according to the packet size limitations of the communications network coupling send components 104 and 604. Send component 604 assembles the fragments transmitted by send component 104. Send translator 614 converts the data from the protocol used to transmit the data from controller 102 to Ethernet module 302 to the protocol used by a remote system. Configuration file 612 contains the details of the synchronous send operation and includes a map that specifies the data conversion conducted by send translator 614. Configuration file 612 is depicted as part of controller 102 but it is to be appreciated that configuration file 612 can be stored on Ethernet module 302 or another location accessible by controller 102 and Ethernet module 302. Transaction manager 108 conveys the translation information in configuration file 612 to its counterpart in Ethernet module 302. Transaction manager 608 configures send translator 614 according to the map provided by configuration file 612.

A synchronous receive operation from a remote system is performed in a similar fashion to a synchronous send operation. Receive component 606 and transaction manager 608 in Ethernet module 302 are associated with receive component 106 and transaction manager 108 in controller 102. Data sent from a remote system is obtained by Ethernet module 302. The data is converted by receive translator 616 from the protocol of the remote system to the protocol used between controller 102 and Ethernet module 302. Configuration file 612 contains the details of the synchronous receive operation and includes a map that specifies the data conversion conducted by receive translator 616. Transaction manager 108 conveys the translation information in configuration file 612 to its counterpart in Ethernet module 302. Transaction manager 608 configures receive translator 616 according to the map provided by configuration file 612. The converted data is transmitted to controller 102 by receive component 606. Receive component 606 transmits data in one or more fragments according to the packet size limitations of the communications network coupling receive components 106 and 606. Receive component 106 in controller 102 assembles the fragments transmitted by receive component 606. Controller 102 is provided with the data transmitted by a remote system by receive component 106 as described with reference to FIG. 2.

Figure 7:
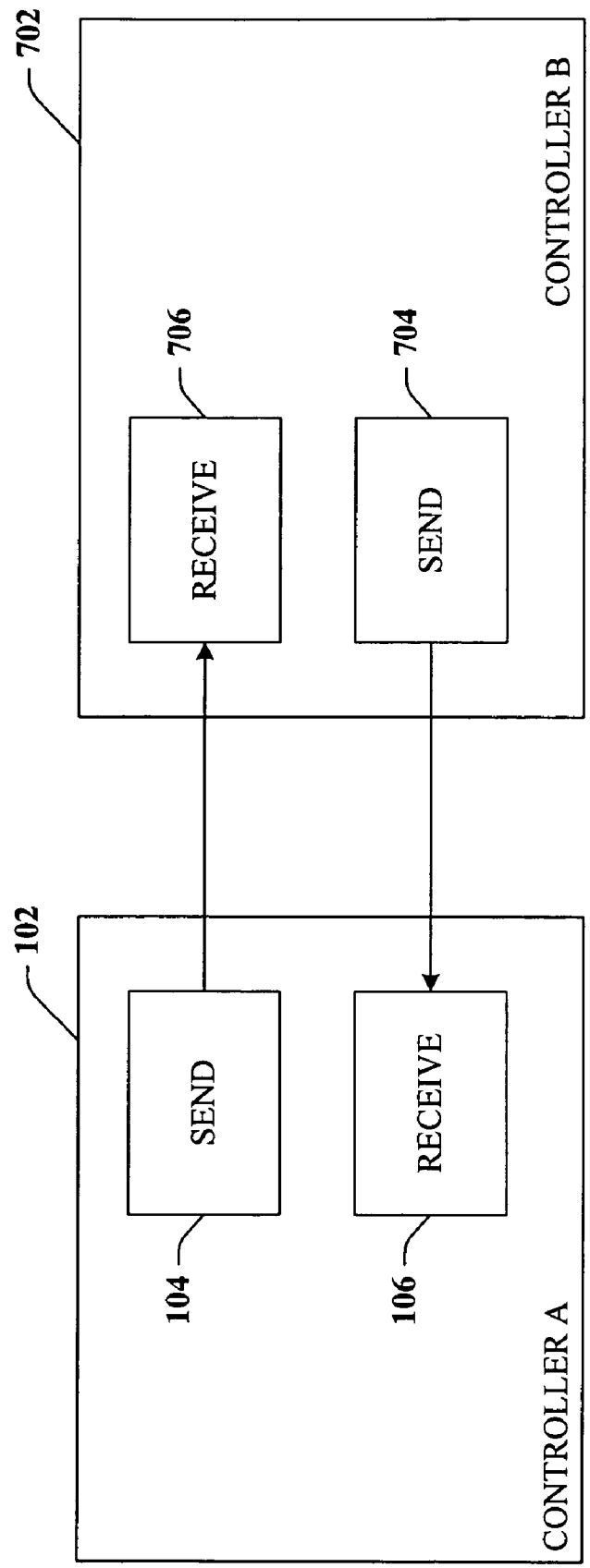
FIG. 7 is a block diagram of a communication system between industrial controllers in accordance with an aspect of the subject invention.

Turning briefly to FIG. 7, system 700 depicts efficient controller-to-controller communication in accordance with an aspect of the subject invention. System 700 includes industrial controllers 102 and 702. Controller A 102 includes send component 104 and receive component 106 and controller B 702 includes send component 704 and receive component 706. Send component 704 and receive component 706 are similar to components 104 and 106, which have been discussed with reference to FIGS. 1-6. Send component 104 transmits data in one or more fragments to receive component 706 associated with controller B 702. Receive component 706 obtains each fragment and assembles them to reproduce the complete data. In a similar fashion, controller B 702 can send data to controller A 102 using send component 704. Controller A 102 can receive data by utilizing receive component 106.

Figure 8:
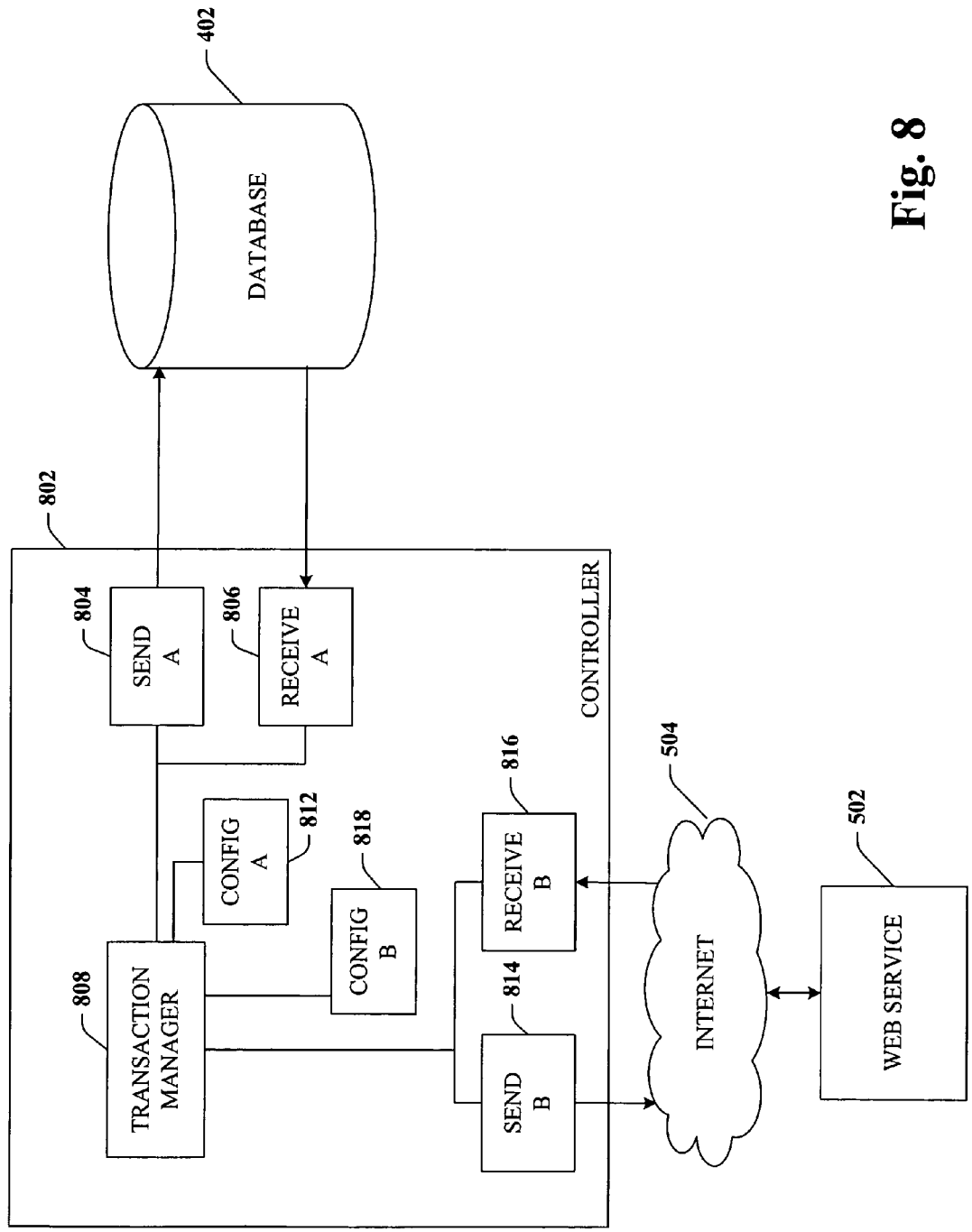
FIG. 8 is a block diagram of an industrial controller communication system that interacts with more than one IT system in accordance with an aspect of the subject invention.

Turning now to FIG. 8, a communication system 800 illustrates integration between a controller 802 and IT systems according to an aspect of the subject invention. Controller 802 can interact with more than one IT system as depicted by system 800. System 800 includes a controller 802, a database server 402, and a web service 502 on the Internet 504. Controller 802 interfaces with database server 402, in the manner discussed with reference to FIG. 4, by employing send component A 804, receive component A 806 and configuration file A 812 associated with components 804 and 806. Configuration file A 812 supplies a framework whereby send component A 804 can transmit the controller data from, for instance, an industrial protocol (e.g. CIP) to a protocol employed by database server 402 (e.g. ODBC, JDBC . . . ). Similarly, receive component A 806 can convert a response from database server 402 from the transactional protocol of the database server 402 to the data format of controller 802. The interaction between controller 802 and web service 502 in the manner discussed previously with regards to FIG. 5, is conducted by utilizing send component B 814, receive component B 816, and configuration file B 818 associated with components 814 and 818. Send component B 814 can convert and transmit the controller data from, for instance, an industrial protocol (e.g. CIP) to a protocol employed by web service 502 (e.g. SOAP). Similarly, receive component A 806 can convert a response from database server 402 from the transactional protocol of the database server 402 to the data format of controller 802. Configuration file B 818 provides the mapping from the controller protocol to the web service protocol. Components 804, 806, 814, and 816 are similar to components 104 and 106 from FIG. 1 which provide for synchronous sending and receiving of data from an industrial controller to a remote system. Transaction manager 808 is similar to transaction manager 108 discussed with reference to FIGS. 1-3 and 6. Transaction manager 808 controls the operations of components 804, 806, 814 and 816 by providing concurrency control of the controller data and maintaining data integrity.

Configuration file A 812 specifies the data format mapping between controller 802 and database server 402 and configuration file B 818 specifies the data format mapping between controller 802 and web service 502. Transaction manager 808 uses the information provided in configuration files 812 and 818 to configure components 804 and 806 and components 814 and 816 respectively.

Figure 9:
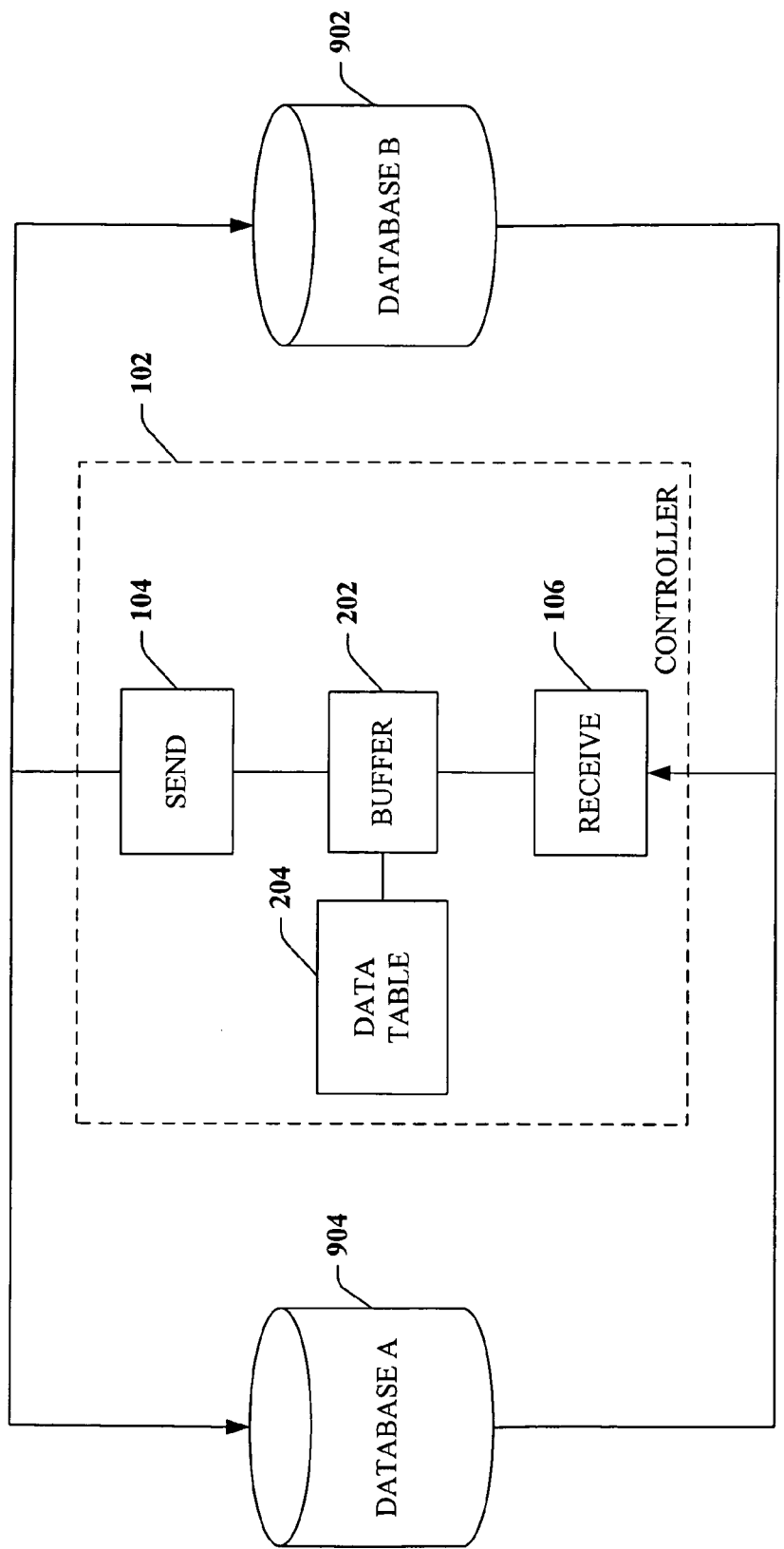
FIG. 9 is a block diagram of a communication system that illustrates integration between a controller and IT systems according to an aspect of the subject invention.

Referring now to FIG. 9, a communication system 900 illustrates integration between a controller 102 and IT systems according to an aspect of the subject invention. Controller 102 can interact with more than one IT system, device or application as depicted by system 900 employing a scatter/gather form of communication. System 900 includes a controller 102, database server A 904 and database server B 902. Controller 102 communicates with database server A 904 and database server B 902 by utilizing send component 104 and receive component 106 as described supra in reference to FIG. 4. Controller 102 provides controller data stored in data table 204 to the send component 102 by replicating desired data in a buffer 202 in the manner described in reference to FIG. 2. Similarly, data from database servers 902 and 904 is assimilated by controller 102 through the interface provided by receive component 106 by storing the data in buffer 202 prior to merging into data table 204.

Data desired to be sent to database servers 902 and 904 is first copied into buffer 202 from data table 204. Send component 104, after formatting the data according to the requirements of database servers 902 and 904, transmits the data from the buffer to both database server A 904 and database server B 902. The transmission, for instance, can be a broadcast message on the communications network between controller 102 and database servers 902 and 904 such that a single transmission is received by both database servers 902 and 904. In this manner, the data can be conveyed to more than one source in a single send operation. It should also be noted that transmission can be to select IT systems, devices (e.g., other controllers . . . ) or applications. For example, if there were three database server devices A, B, and C rather than two A and B then transmission could be to database A and C only or any other combination thereof. The scatter transmission of send component 104 negates the need for additional send components or more than one data transmission in order to send data to multiple IT systems.

Similarly, receive component 106 can receive data from more than one IT system. Database servers 902 and 904 can transmit requested data to controller 102 at the same time. Receive component 106 will accept both transmissions from database servers 902 and 904 and assemble the data in buffer 202. Controller 102 will then merge the buffer into data table 204. The gather operation of receive component 106 removes the need to receive separate transmissions in order to capture the data from database servers 902 and 904. This allows, for example, for better database design by permitting separation of distinct data into different databases. For example, the input states of an industrial device can be stored in database server A 904 and the output states relating the industrial device can be stored in database server B 902. Controller 102 can request and receive both types of data in a single transaction. Furthermore, the states can be provided to one or more specific devices (e.g., memory . . . ) or applications for employment.

Figure 10:
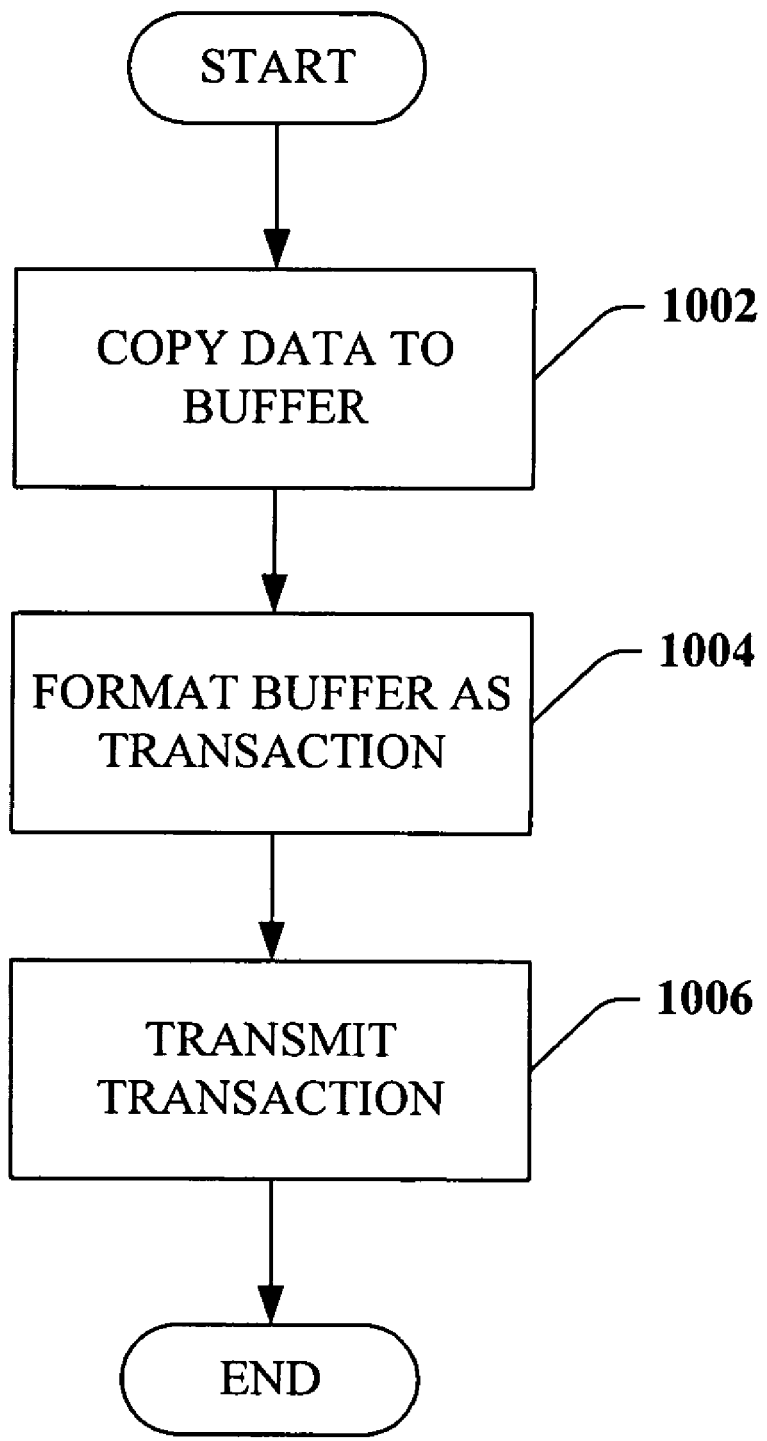
FIG. 10 is a flow diagram of an industrial control system communication methodology.
Figure 11:
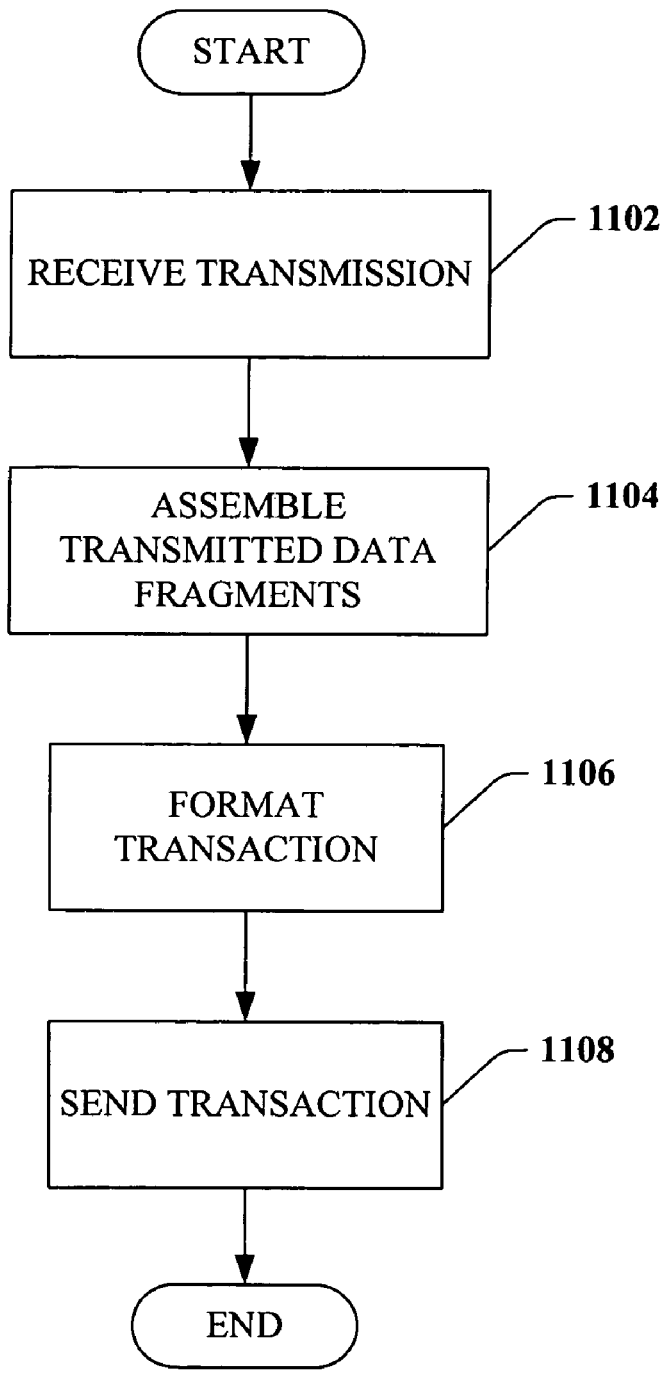
FIG. 11 is a flow diagram of an industrial control system communication methodology.
Figure 12:
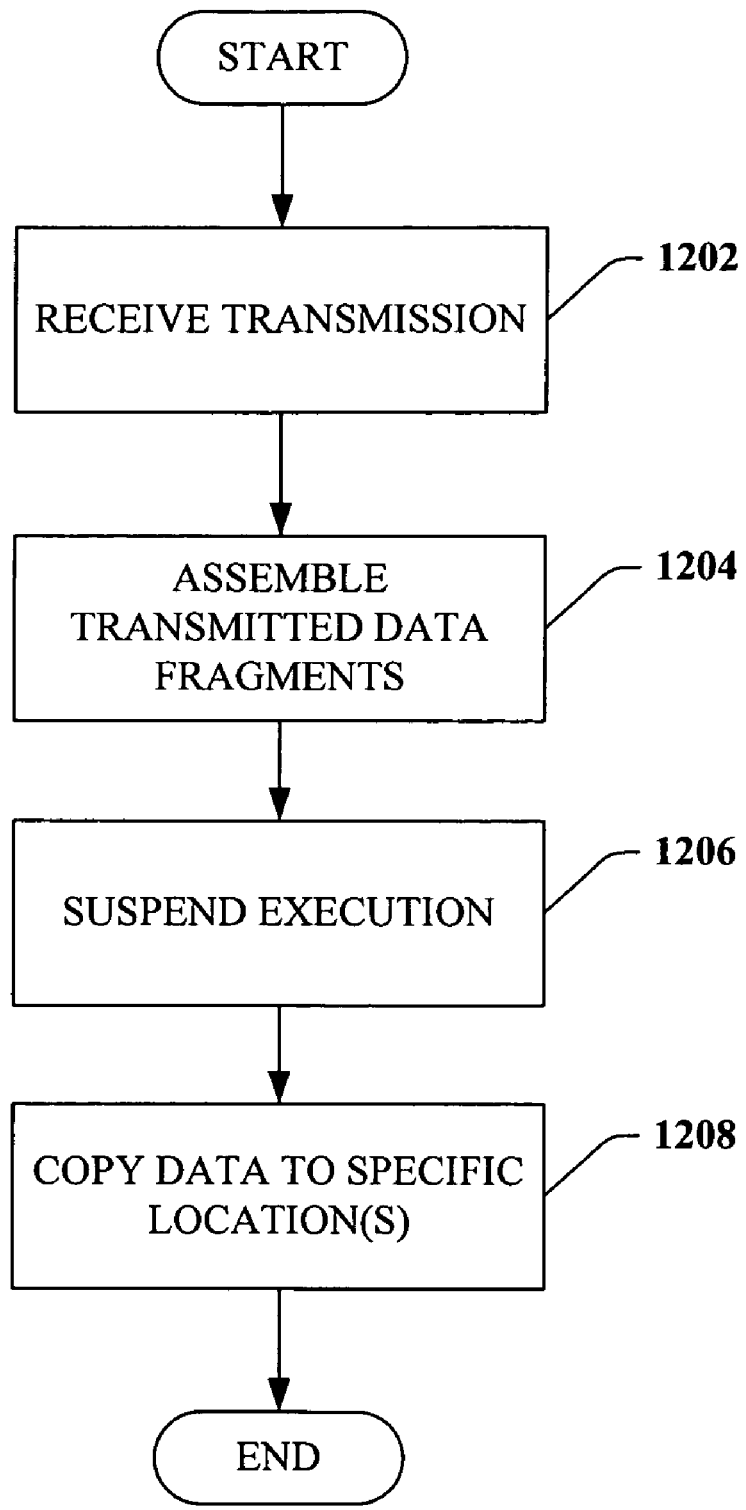
FIG. 12 is a flow diagram of an industrial control system communication methodology.

In view of the exemplary systems described supra, methodologies that may be implemented in accordance with the disclosed subject matter will be better appreciated with reference to the flow charts of FIGS. 10-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Turning now to FIG. 10, a flow diagram illustrates a communication methodology 1000 in accordance with one aspect of the subject invention. Method 1000 can be employed in a scenario wherein an industrial controller transmits data to an IT system, but is not limited to such a situation. For instance, method 1000 may occur when a synchronous send instruction is encountered in control application 110 of FIG. 1. At reference numeral 1002, data is copied into a buffer. For example, controller data can be copied from a controller data table into a buffer. To ensure data integrity, all other tasks in the controller can be suspended until the copy is complete. At reference numeral 1004, the data in the buffer is formatted as a transaction. For instance, the controller data table replicated into the buffer may be formatted in an industrial protocol (e.g. CIP) and is converted into an IT system format such as JDBC or SOAP. At reference numeral 1006, the transaction is transmitted. For instance, the data buffer can be sent over any communications network from a controller to an IT system. The data can be split into one or more fragments depending on the conditions present on the communications network. For example, the network may have a maximum packet size of 512 bytes and the buffer is 1024 bytes, thus requiring the data to be split and sent as two fragments. Furthermore, data can be sent to one or more specified locations.

FIG. 11 depicts a flow diagram illustrating a communication methodology 1100 according to one aspect of the subject invention. Method 1100 can be employed by an Ethernet module or computer associated with an industrial controller to facilitate interaction with an IT system, but is not limited to such a situation. At reference numeral 1102, a data transmission is received. At reference numeral 1104, the one or more data fragments of the data transmission are assembled together. For instance, a data transmission with a size of 2048 bytes can be received as four fragments with sizes of 512 bytes each. At 1106, a transaction is formatted with the assembled data. For example, the assembled data can be formatted as a database query transaction. At 1108, the formatted transaction is sent to the IT system. For instance, the formatted database query is sent to a database server.

Turning now to FIG. 12, a flow diagram illustrates a communication methodology 1200 in accordance with one aspect of the subject invention. Method 1200 can be employed in a scenario wherein an industrial controller receives a data transmission from an IT system, but is not limited to such a situation. For instance, method 1200 may occur when a synchronous receive instruction is encountered in control application 110 of FIG. 1. At reference numeral 1202, a data transmission is received. At reference numeral 1204, the one or more data fragments of the data transmission are assembled together into a buffer. For instance, a data transmission with a size of 2048 bytes can be received as four fragments with sizes of 512 bytes each. At 1206, program execution, for instance within a controller, can be suspended to preserve data integrity. At reference numeral 1208, the buffer is copied to one or more specific locations (e.g., data table, application, module . . . ). For example, the transmitted data can include a series of one or more pointers that identify locations and corresponding data can be moved or copied to the specified locations.

Figure 13:
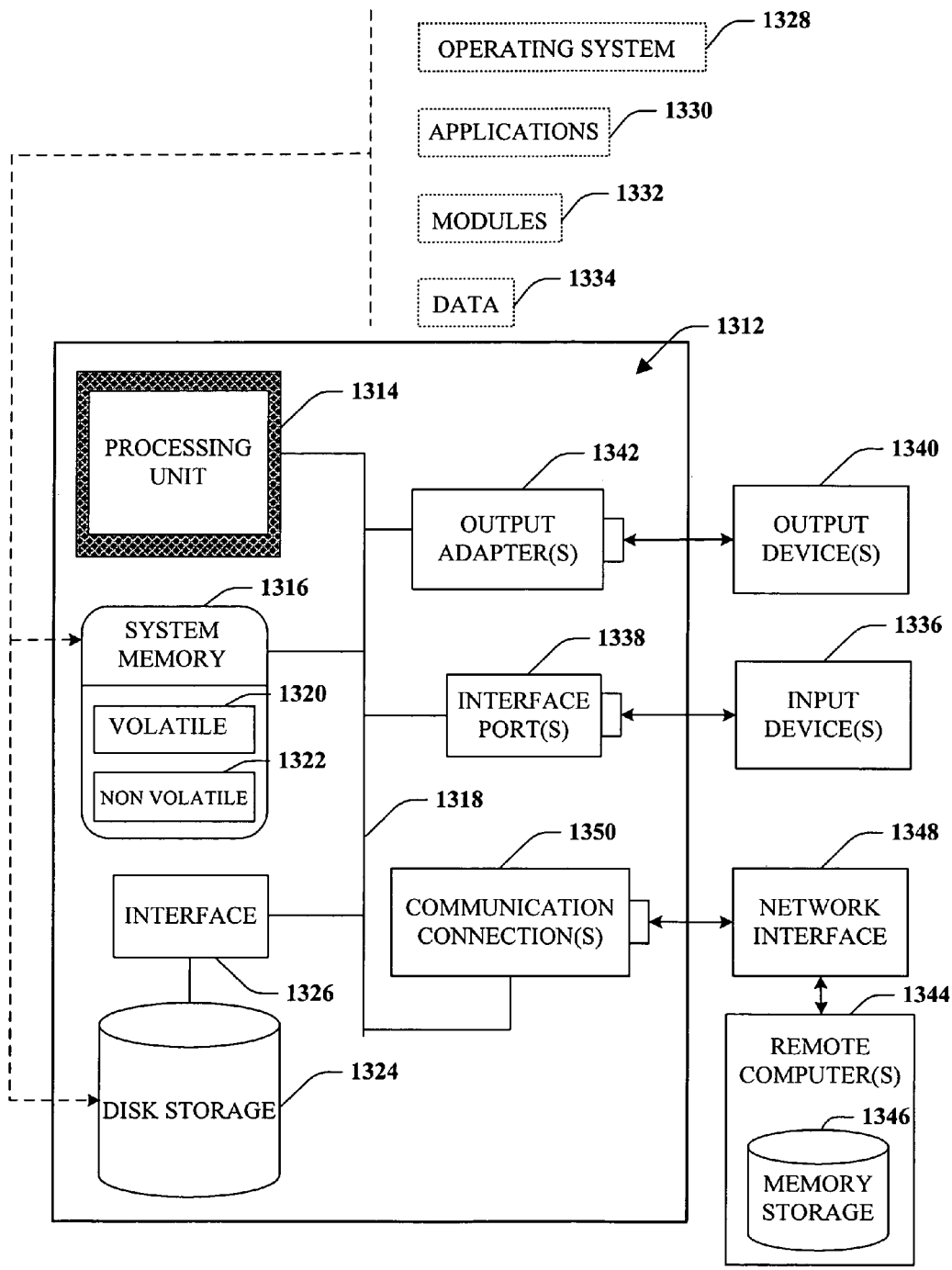
FIG. 13 is a schematic block diagram illustrating a suitable operating environment.

In order to provide a context for the various aspects of the disclosed subject matter, FIG. 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1216 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like displays (e.g., flat panel, CRT, LED, LCD . . . ), speakers, and printers, among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereof, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems, power modems and DSL modems, ISDN adapters, and Ethernet cards or components.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," "having," or variations in form thereof are used-in either the detailed description or the claims, such terms are intended to be inclusive in a manner similar to the term "comprising" as "comprising" is interpreted when employed as a transitional word in a claim.

What is claimed is:

1. An industrial control module communication system, comprising:
    an industrial control module that executes a control program to measure inputs and to control outputs of at least an industrial process in a continuous operating environment, further comprising:
    a data table storing acquired data and processed data of the industrial control module;
    a data buffer operatively separated and isolated from the data table;
    a send component instructed by the control program to replicate data from the data table to the data buffer, to convert the data from a continuous serial format to a transactional format which is executable by a transactional remote system, and to send the data to the transactional remote system;
    a receive component instructed by the control program to receive data from the transactional remote system to store in the data buffer, to convert the data from the transactional format into the continuous serial format which is executable by the industrial control module, and to copy the data into the data table after being fully received;
    a transaction component that configures and controls the send component and the receive component; and
    a scheduler to schedule one or more concurrent tasks to be executed;
    wherein, if data is to be sent via the send component during execution of the control program, the transaction component suspends execution of the scheduler so that no other tasks are performed to prevent the industrial control module from modifying the data table until replication of the data from the data table into the data buffer by the send component is complete.

2. The system of claim 1, the send component splits the data into one or more fragments prior to sending the data to the transactional remote system, and the receive component joins one or more fragments of data received from the transactional remote system to assemble control data for use by the industrial control module.

3. The system of claim 1, wherein the continuous serial format is Common Industrial Protocol (CIP) and the transactional format is a database protocol, the send component converts the control data from the Common Industrial Protocol (CIP) to the database protocol prior to sending the control data to a transactional remote system that is a database.

4. The system of claim 1, wherein the transactional remote system is at least one of a control module, a database, a web service, or a transaction management server.

5. The system of claim 1, wherein the continuous serial format is Common Industrial Protocol (CIP) and the transactional format is a protocol employed by a web service, the send component converts the control data from the Common Industrial Protocol (CIP) to the protocol employed by a web service prior to sending the control data to a web service.

6. The system of claim 1, wherein the send component broadcasts the control data to a plurality of selected transactional remote systems.

7. The system of claim 1, wherein the receive component receives data from more than one transactional remote system.

8. A method for sending data of a continuous serial data system in a continuous operating environment to a transactional data system in a transactional operating system, comprising:
    executing a control program in the continuous serial data system;
    polling data in a continuous serial format into a data table in the continuous serial data system, wherein the data represents measured inputs from or control outputs to at least one process control device coupled and being controlled by the continuous serial environment;
    replicating and transmitting the data from the data table into a data buffer which is operatively separated and isolated from the data table;
    converting the data in the continuous serial format to a plurality of data fragments in a transactional format which is executable by the transactional data system; and sending the plurality of data fragments to the transactional data system according to requirements of the transactional data system;

wherein the replicating and transmitting, the converting, and the sending are performed by a send component, and during the replicating and the transmitting, execution of a scheduler that interacts with the control program to schedule one or more concurrent tasks to be executed is suspended such that no other tasks are performed to prevent the continuous serial data system from modifying the data table until the replicating and transmitting is complete.

9. The method of claim 8, further comprising determining any protocols restricting data packet size during transmission of data via a communications network between the continuous serial data system and the transactional data system.

10. The method of claim 9, further comprising splitting the data into one or more fragments if a protocol restricting data packet size is detected.

11. The method of claim 8, the sending comprising sending the data to one or more remote systems.

12. A computer readable storage device having stored thereon computer executable instructions to carry out the method of claim 8.

13. A method for receiving data of a continuous serial data system in a continuous operating environment from a transactional data system in a transactional operating environment, comprising:

executing a control program in the continuous serial data system;

requesting data from a transactional data system, wherein the data represents measured inputs from or control outputs to at least one process control device coupled and being controlled by the continuous serial data system;

receiving the data in a plurality of data fragments from the transactional data system at a data buffer, wherein the plurality of data fragments are in a transactional format which is executable by the transactional data system;

converting the plurality of data fragments in the transactional format into a continuous serial format which is executable by the continuous serial data system;

assembling the plurality of data fragments to yield assembled data; and copying the assembled data from the data buffer into a data table, wherein the data buffer is operatively separated and isolated from the data table;

wherein the receiving, the converting, and the copying are performed by a receive component, and during the copying, a notification is generated to suspend execution of a scheduler that interacts with the control program to schedule one or more concurrent tasks to be executed such that no other tasks are performed to prevent modification of the data table until the copying is complete.

14. The method of claim 13, further comprising receiving a receive instruction to initiate the receiving, the converting, the assembling, and the copying.

15. The method of claim 13, further comprising receiving data in a transactional format from a remote system.

16. A computer readable storage device having stored thereon computer executable instructions to carry out the method of claim 13.

* * * * *